E. C. WASHBURN.
LATERAL MOTION CAR TRUCK.
APPLICATION FILED AUG. 19, 1908.
913,333.
Patented Feb. 23, 1909.
2 SHEETS—SHEET 1.
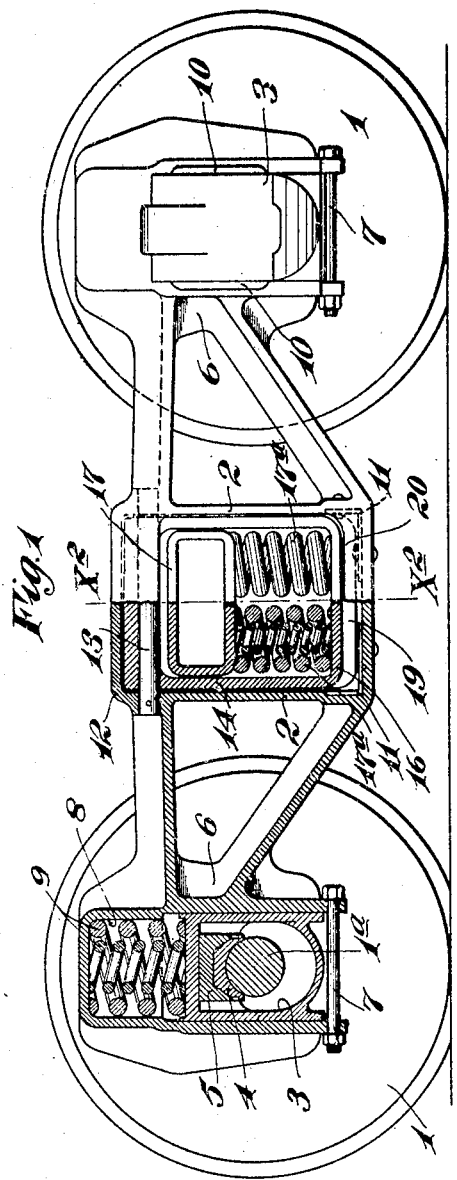
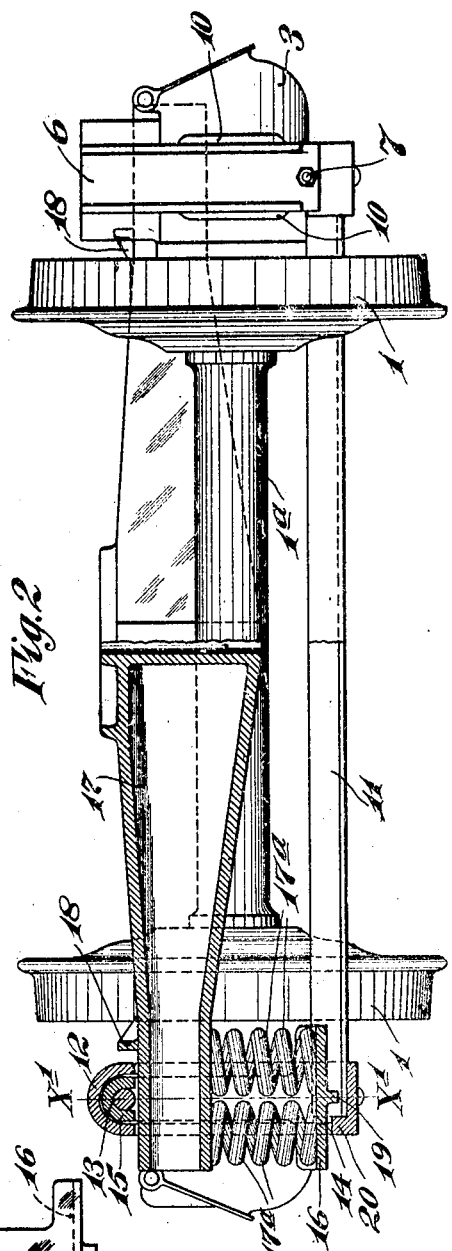
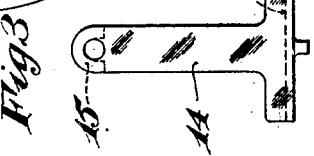
Witnesses:
W. H. Souba.
Harry Opsahl.
Inventor:
E. C. Washburn.
By his Attorneys.
Williamson Merchant

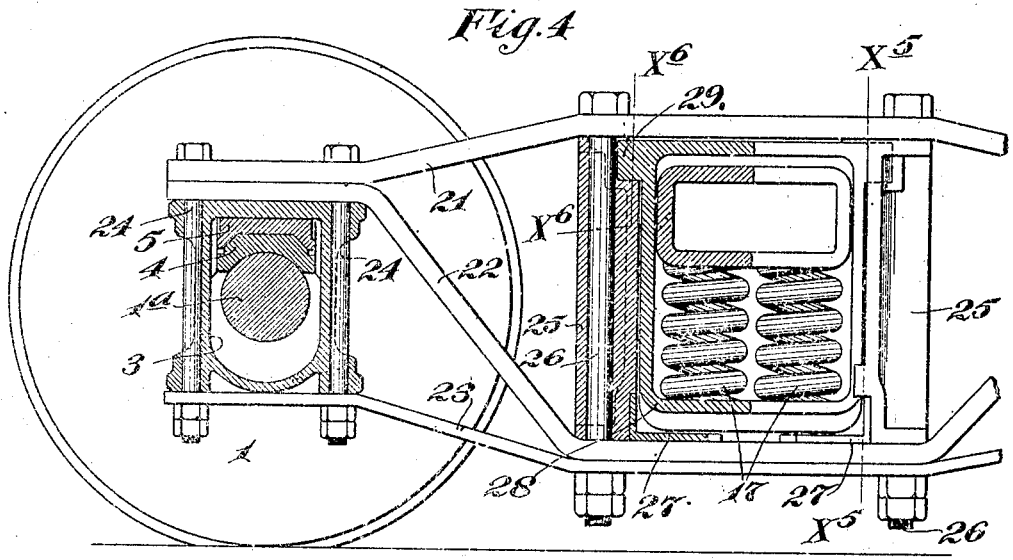
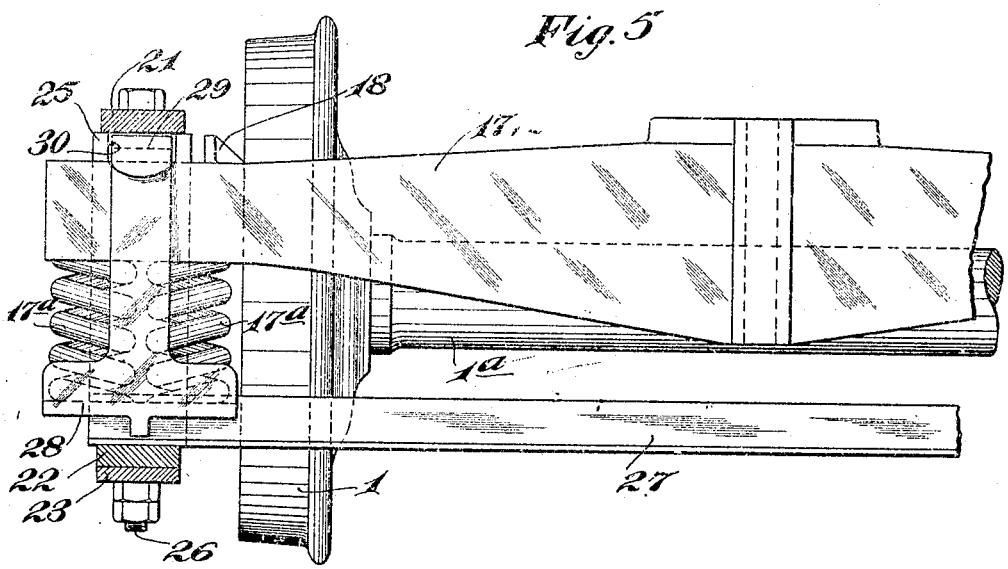

UNITED STATES PATENT OFFICE.

EDWIN C. WASHBURN, OF MINNEAPOLIS, MINNESOTA.

LATERAL-MOTION CAR-TRUCK.

No. 913,333.  Specification of Letters Patent.  Patented Feb. 23, 1909.

Application filed August 19, 1908. Serial No. 449,219.

*To all whom it may concern:*

Be it known that I, EDWIN C. WASHBURN, a citizen of the United States, residing at Minneapolis, in the county of Hennepin and State of Minnesota, have invented certain new and useful Improvements in Lateral-Motion Car-Trucks; and I do hereby declare the following to be a full, clear, and exact description of the invention, such as will enable others skilled in the art to which it appertains to make and use the same.

My present invention relates to car trucks and has for its especial object to provide an improved lateral motional device therefor.

To the above ends, the invention consists of the novel devices and combinations of devices hereinafter described and defined in the claims.

In the accompanying drawings which illustrate the invention, like characters illustrate like parts throughout the several views.

Referring to the drawings: Figure 1 is a view partly in side elevation and partly in vertical section on the line $x^1 x^1$ of Fig. 2, showing a car truck embodying my invention. Fig. 2 shows an improved car truck partly in front elevation and partly in transverse section on the line $x^2 x^2$ of Fig. 1. Fig. 3 is a side elevation showing in detail one of the so-called bolster stirrups. Fig. 4 is a view partly in side elevation and partly in vertical section and with some parts broken away, showing a car truck embodying a modified form of my invention. Fig. 5 is a transverse vertical section taken approximately on the line $x^5 x^5$ of Fig. 3 some parts being broken away. Fig. 6 is a fragmentary detail showing a portion of one of the bolster columns sectioned on the line $x^6 x^6$ of Fig. 4.

Of the parts of the car truck, the numeral 1 indicates the wheels secured to axles 1ª in the usual way, and journaled in axle boxes 3, the usual bearing brasses 4 and keys 5 being inserted between the tops of said axle boxes and the journals of the said axles.

In the construction illustrated in Figs. 1 to 3 inclusive, the truck side frames are of cast steel construction being made up of top and bottom arch bars, the intermediate portions of which are cast integral with bolster columns 2 and the end portions of which are cast integral with bifurcated axle box receiving heads 6 in which the axle boxes 3 are mounted with freedom for limited vertical sliding movements. Through the open lower ends of the axle box seats of the said head 6, bolts 7 are passed to normally hold the axle boxes against displacement. Immediately over the axle boxes 3, the heads 6 are formed with inverted cylindrical spring pockets 8 in which springs 9 are placed. These springs 9 yieldingly support the truck side frames 1 directly from the tops of the axle boxes 3. The said axle boxes 3 are formed with vertical ribs 10 that engage the sides of the bifurcated heads 6 and hold the said axle boxes against movements transversely of the truck side frames. The lower portions of the columns 2 and of the lower arch bar portions of the two truck side frames are rigidly connected by transoms or tied bars 11, preferably formed by a pair of reversely turned angle bars the ends of which are riveted to the said truck side frames. The top bar of the truck side frames in that portion which spans the portion between the upper portions of the bolster columns 2, is formed approximately semi-cylindrical as indicated at 12, is open at its bottom, and is raised so that heavy pivot rods or bolts 13 may be inserted endwise therethrough. It will be noted that both the upper and lower bars of the truck side frames are in this case channel shaped, and that the bifurcated heads 6 are reinforced by laterally spaced ribs. Working between the truck bolsters 2 of each side frame and pivoted at its upper end on the pivot bolt 13, is a so-called bolster stirrup preferably made rectangular in contour. These stirrups which are indicated as entireties by the numeral 14, are provided with transverse upper portions preferably made approximately semi-cylindrical as indicated at 15, and the bolts 13 are passed directly through the said portions 15. The transverse lower or base portions of the stirrups 14 are expanded or widened out to afford suitable spring bases 16, upon each of which, four bolster supporting springs 17ª are rested at their lower ends. The truck bolster 17 which as illustrated is of hollow cast steel construction, is at its central portion, provided with the usual or any suitable arrangement for pivotal connection by means of center bearing, to the car bolster as shown. The ends of the said bolster are passed through the stirrups 14 and are seated on the upper ends of the two groups of springs 17ª. Preferably the spring bases 16 and the ends of the bolster 17 are formed with bosses which hold the ends of the said spring 17ª in proper position in respect thereto. The truck bolster 17, on top and near its ends, is provided with stop lugs 18 adapted to engage the portions 12 of the truck side frame to limit the endwise movement of the bolster transversely of the truck. The stirrups 14 are provided with depending stop lugs or flanges 19 that are engageable with stop flanges 20 on the bottom bar of the side frames, to directly limit the outward oscillatory movements of the stirrup on the pivot bolts 13.

With the construction described, it is evident that the truck bolsters of two car trucks supported as above described, will be free for movements transversely with the truck so as to thereby permit lateral movements of the car bolster in respect to the truck wheels or vice-versa. The object of this, as is well known, is to prevent undue lateral strains on the rails due to swinging movements of the car body. Also, it is evident, in a vertical direction, there will be a yielding action of the springs between the truck side frames and the axle boxes as well as of the springs between the said side frames and the truck bolster. This gives an extremely resilient support for the car body, and hence, is especially well adapted for use in passenger coaches. Also, with the construction above described, it is a very easy matter to remove the truck bolster from the car truck and at the same time there is no danger of accidental disconnection thereof from the trucks.

With the construction described, there is very little danger of breaking either stirrup or its supporting pivot bolt 13, but in case of such accident, the lower portions of the broken stirrup will simply fall upon the underlying position of the lower arch bar of the side frame and would be held in operative position so that the truck would not be entirely disabled.

Referring next to the construction illustrated in Figs. 4, 5 and 6, it will be noted that the truck side frames are made up of customary arch bars 21 and 22 and the bottom bar 23; that the axle boxes 3 are rigidly clamped to the ends of said bars by the customary nutted bolts 24; and that the bolster columns 25 are secured by column bolts 26 between the intermediate portions of the said bars approximately in the usual way. Angle iron transoms 27 rigidly connect the lower portions of the bolster column 25 and arch bars 22 of the laterally spaced side frames. In this construction, the bolster stirrups 28, which are otherwise substantially the same as the stirrup 14, are in this instance, formed at the ends of the transverse upper portions with integrally cast trunnions 29 that engage seat 30 formed in the upper ends of the bolster columns 25.

What I claim is:

1. In a car truck the combination with endless stirrups pivotally connected to the side frames thereof, of a truck bolster supported by said stirrups for endwise movements transversely of the truck.

2. In a car truck the combination with endless stirrups pivotally connected thereto at their upper ends, of a truck bolster and springs interposed between said truck bolster and said stirrup whereby said truck bolster is yieldingly supported with freedom for limited endwise movements transversely of the truck.

3. In a car truck the combination with approximately rectangular endless stirrups pivotally connected at their upper ends to the side frames thereof, springs seated on the lower portions of said stirrups, and a truck bolster the ends of which project through said stirrup and are seated on said springs, the said bolster being yieldingly mounted for endwise movements transversely with the truck.

4. In a car truck the combination with endless stirrups pivotally connected at their upper ends to the side frames thereof, and a truck bolster supported by said stirrups for limited endwise movements transversely of the truck, the said bolster having stops engageable with said side frames to limit the endwise movements thereof.

5. In a car truck, an endless stirrup pivoted thereto, springs supported by said stirrup, and a bolster projecting through said stirrup and supported by said springs.

6. In a car truck, endless stirrups seated therein and pivotally connected thereto at their upper ends, springs carried by said stirrup, and a bolster projecting through said stirrups and supported by said springs.

7. In a car truck, the combination with endless approximately rectangular stirrups seated in approximately rectangular openings in said side frame and pivotally connected thereto at their upper ends, springs carried by said stirrups, and a bolster projecting through said stirrups and carried on said springs.

8. In a car truck approximately rectangular endless stirrups having expanded bases in their lower portions and pivotally connected at their upper portions to the truck side frame, groups of springs seated on the bases of said stirrups, and a truck bolster the ends of which are extended through said stirrups and are seated on said springs.

9. In a car truck the combination with cast side frames having approximately semicylindrical raised intermediate upper bar portions, of approximately rectangular endless stirrups working in approximately rectangular openings in said side frame, bolts pivotally connecting the upper portions of said stirrups to the raised semi-cylindrical portions of said side frame, springs carried by said stirrups; and a bolster the ends of which work through said stirrups and rest on said springs.

10. A car truck having cast side frames formed with inverted channel shaped portions spanning the openings between columns, and bolster supporting stirrups having their upper portions located within and pivotally connected to said inverted channels.

11. In a car truck, the combination with cast side frames having inverted channel shaped portions spanning the openings between columns, pivot shafts extended longitudinally through said channel shaped portions, and bolster supporting stirrups pivoted on said shafts.

12. In a car truck, the combination with cast side frames having inverted channel shaped portions spanning the openings between columns; pivot shafts extended longitudinally through the channel shaped portions, and endless bolster supporting stirrups having their upper portions pivoted on said shafts and covered by said channel shaped portions.

13. In a car truck, the combination with cast side frames having raised inverted channel shaped portions spanning the openings between bolster columns, of pivot shafts extended longitudinally through said channel shaped portions and removable endwise therefrom, and bolster supporting stirrups pivoted on said shafts.

14. In a car truck, the combination with cast side frames having raised channel shaped portions spanning the openings between bolster columns, pivot shafts extended longitudinally through said channel shaped portions and removable endwise through the end portions thereof, and approximately rectangular endless bolster supporting stirrups having their transverse upper portions pivoted on said shafts and covered by said channel shaped portions.

In testimony whereof I affix my signature in presence of two witnesses.

EDWIN C. WASHBURN.

Witnesses:
  A. J. SWANSON,
  H. D. KILGORE.